(12) United States Patent
Chen et al.

(10) Patent No.: US 7,738,067 B2
(45) Date of Patent: Jun. 15, 2010

(54) METHOD OF MANUFACTURING SPACERS ON A COLOR FILTER SUBSTRATE

(75) Inventors: Yu-Jen Chen, Tainan County (TW); Yuan-Liang Wu, Tainan County (TW); Ching-Shan Lin, Tainan County (TW)

(73) Assignee: Chimei Innolux Corporation, Miaoli County (TW)

( * ) Notice: Subject to any disclaimer, the term of this patent is extended or adjusted under 35 U.S.C. 154(b) by 1248 days.

(21) Appl. No.: 11/059,074

(22) Filed: Feb. 16, 2005

(65) Prior Publication Data
US 2005/0179853 A1    Aug. 18, 2005

(30) Foreign Application Priority Data
Feb. 17, 2004   (TW) ............... 93103812 A
Feb. 4, 2005    (TW) ............... 94103549 A

(51) Int. Cl.
*G02F 1/1335*   (2006.01)
*G02F 1/1339*   (2006.01)

(52) U.S. Cl. .............. 349/155; 349/106; 349/157

(58) Field of Classification Search .......... 349/38, 349/39, 41–53, 106–111, 129, 155–157
See application file for complete search history.

(56) References Cited

U.S. PATENT DOCUMENTS

| | | | |
|---|---|---|---|
| 5,793,457 A * | 8/1998 | Tamai et al. ............ | 349/110 |
| 5,838,414 A * | 11/1998 | Lee ........................ | 349/157 |
| 6,187,485 B1 * | 2/2001 | Matsushima et al. .... | 430/7 |
| 6,238,754 B1 * | 5/2001 | Shohara et al. ......... | 428/1.5 |
| 6,245,469 B1 * | 6/2001 | Shiba et al. ............. | 430/7 |
| 6,445,438 B1 * | 9/2002 | Horie et al. ............. | 349/187 |
| 6,678,031 B2 * | 1/2004 | Song ....................... | 349/155 |
| 6,795,141 B2 * | 9/2004 | Yamada ................... | 349/106 |
| 7,057,695 B2 * | 6/2006 | Mun et al. ............... | 349/141 |

(Continued)

FOREIGN PATENT DOCUMENTS

JP    2003-98550    4/2003

(Continued)

OTHER PUBLICATIONS

Taiwanese Office Action, Jul. 27, 2005.

*Primary Examiner*—David Nelms
*Assistant Examiner*—Jessica M Merlin
(74) *Attorney, Agent, or Firm*—Thomas, Kayden, Horstemeyer & Risley

(57) ABSTRACT

A liquid crystal display device, a color filter substrate and a protruding structure, and a manufacturing method thereof are provided. The color filter substrate includes a transparent substrate, a black matrix, a plurality of color filters, a plurality of first protruding structures, and a plurality of second protruding structures. The black matrix is disposed on the transparent substrate and exposes part of the transparent substrate for defining a plurality of first openings, a plurality of second openings, and a plurality of pixel regions, wherein the size of each first opening is different from the size of each second opening. In addition, the color filters are disposed in the pixel regions. The first protruding structures and the second protruding structures are disposed on the transparent substrate, wherein the first protruding structures correspond to the first openings respectively and the second protruding structures correspond to the second openings respectively.

8 Claims, 23 Drawing Sheets

U.S. PATENT DOCUMENTS

| | | | |
|---|---|---|---|
| 2001/0040665 A1* | 11/2001 | Ahn | 349/156 |
| 2003/0142248 A1* | 7/2003 | Park et al. | 349/86 |
| 2004/0125279 A1* | 7/2004 | Lee et al. | 349/110 |
| 2004/0212762 A1* | 10/2004 | Yeh et al. | 349/110 |
| 2004/0246424 A1* | 12/2004 | Sawasaki et al. | 349/138 |
| 2005/0110922 A1* | 5/2005 | Lee et al. | 349/106 |
| 2006/0033876 A1* | 2/2006 | Park et al. | 349/155 |
| 2006/0103803 A1* | 5/2006 | Jeon et al. | 349/155 |

FOREIGN PATENT DOCUMENTS

| | | |
|---|---|---|
| TW | 573190 | 1/2004 |
| WO | WO 02/063383 | 8/2002 |

* cited by examiner

Rhombus

Rectangle

Square

Octagon

METHOD OF MANUFACTURING SPACERS ON A COLOR FILTER SUBSTRATE

BACKGROUND OF INVENTION

1. Field of the Invention

The present disclosure relates to a display structure and a method for fabricating the same, and more particularly, to the structure of a liquid crystal display device and a method for fabricating the same.

2. Description of the Prior Art

A conventional liquid crystal display (LCD) device generally includes a pair of substrates, in which the substrates are parallel and separated from each other by a distance. The space between the substrates is usually referred to as the liquid crystal cell gap or, simply, cell gap. Additionally, a liquid crystal material is disposed between the two substrates within the cell gap, in which the liquid crystal material is able to respond to an outside electronic signal, thereby altering its optical characteristics. The electronic signal is controlled by a plurality of electrodes disposed on the inner surface of the substrates. The electrode arrangement of some particular LCD devices is able to generate a group of predetermined characters or symbols whereas the electrode matrix of other LCD devices is able to produce a display image. The display image essentially includes a large number of pixel devices, in which each pixel device can be optionally turned on to generate an image with many variations.

In order to ensure proper operation of the LCD device, the cell gap has to be maintained precisely and uniformly, since imprecision within the cell gap can easily result in a defective display image (a condition usually referred to as mura). Moreover, a slight touch from a finger tip will also influence the image of the display. To respond to such pressure, the cell gap within the influenced area is slightly decreased, thereby reducing the contrast and intensity of the dark spot or any other side effect in the display image.

As shown in FIG. 1, a conventional LCD display includes a thin film transistor (TFT) substrate 61, a color filter (CF) substrate 71, and a liquid crystal material 69 disposed between the two substrates. The cell gap is usually maintained by a plurality of spacers 79 formed between the substrates 61 and 71. Disposed randomly via a dispersion technique within the cell gap, the spacers 79 are equal in height, which often result in partial uneven distribution of the spacer density. In order to maintain a uniform cell gap and the concentration of the spacers, an exceedingly higher number of spacers is often utilized. Additionally, the spacers are often disposed in both inactive and active areas of the display panel according to the conventional method. Located between two corresponding electrodes on the substrate, the active area is an area where the liquid crystal material can be selectively activated, whereas the liquid crystal material in an inactive area is unable to be selectively activated as the area lacks a pair of corresponding electrodes.

In general, the structure and function of a LCD display utilized by the conventional spacer technique results in several unwelcoming features. For instance, the spacers located within the active area will likely result in numerous disadvantages including reduced contrast or abnormal light irradiation in proximity to the edge of the spacers.

According to the European Patent No. 1,030,211 A2, an LCD utilizing a method of eliminating the step of dispersing the spacers thereby preventing the uneven distribution of spacers and difference in cell thickness is disclosed. As shown in FIG. 2, the LCD device includes a TFT substrate 30, a CF substrate 40, and a liquid crystal layer 49 sealed in between the two substrates. Additionally, protruding patterns formed on the CF substrate 40 are spacers 45, in which the spacers are approximately 4 μm in height and utilized for maintaining the uniformity of the cell gap.

In general, the cell gap of an LCD is the average distance between the two alignment films of two substrates, in which the average distance often equals to the height of the spacer after the two substrates are combined.

Nevertheless, the spacer 45 from the conventional technique or the European patent are disposed on a glass substrate 41, in which a color filter 43 is disposed in between the spacers 45 and the glass substrate 41.

Please refer to FIG. 3. FIG. 3 is a stress-strain diagram showing the relationship between a 20Φ μm columnar spacer directly disposed on a glass substrate and a columnar spacer disposed on a glass substrate having a color filter disposed in between. As shown in FIG. 3, the spacers disposed directly on the glass substrate are mostly elastomers, as shown by curve A, whereas other spacers disposed on the glass substrate having color filters in between are partially elastic, as shown by curve B, in which a permanent strain d will be generated when a loading is released from the spacers. If the loading (a pressure or stress) of the LCD device is big enough to generate the permanent strain, the total height of the spacer and the color filter disposed on the glass substrate will be altered. In other words, after a relatively large pressure is applied to the LCD panel, the uniformity of the cell gap will be disrupted, thereby resulting in effects such as mura.

In addition, numerous methods have been introduced regarding the deposition of the liquid crystal material between two substrates of an LCD. For instance, necessary components of a display panel including the thin film transistor, circuits, and color filters have to be prepared first. Next, epoxy is utilized to laminate the two substrates together, in which the substrates are separated by a distance of about 5 μm. Next, the laminated substrate is placed in a vacuum room with a container holding liquid crystal materials, in which the gap of the laminated substrate is situated in a vacuum environment. Next, the laminated substrate is moved towards the liquid crystal container and by disrupting the vacuum, the liquid crystal material is slowly absorbed by the laminated substrate via a capillary effect and the pressure outside the substrate.

In recent years, a more advanced deposition technique referred to as one drop fill has been introduced. According to this technique, a liquid crystal material is dropped into one of the substrates before two substrates are laminated. U.S. Pat. No. 5,263,888 issued to Teruhisa Ishihara et al. on Nov. 23, 1993 describes a method of manufacture a liquid crystal display panel, in which the one drop fill technique is disclosed.

One of the most influential factors regarding the one drop fill technique is the elasticity of spacers. When the number of spacers is too small or the elastic deformation is too large (such as a very small elastic coefficient), the volume of the liquid crystal is likely to overly increase, thereby resulting in gravity mura. Conversely, when the number of spacers is too large or the elastic deformation is too small (such as a very large elastic coefficient), the volume of the liquid crystal will overly decrease, thereby generating air bubbles. Ideally, spacers with much bigger height will be able to obtain a much better operation window.

SUMMARY OF INVENTION

According to some embodiments of the present invention, a method of fabricating protruding structures includes: providing a color filter (CF) substrate or a thin film transistor (TFT) substrate, in which the CF substrate or the TFT substrate includes a masking pattern thereon and the masking pattern defines a plurality of openings. Next, a photoresistance is formed on the CF substrate or the TFT substrate and a back-exposure process is performed on the photoresistance from the other side of the substrate.

According to other embodiments of the present invention, an LCD device includes a first substrate, a second substrate, a liquid crystal layer, a plurality of first protruding structures and a plurality of second protruding structures. The first substrate is laminated with the second substrate to form a cavity, and the second substrate includes a masking pattern, in which the masking pattern defines a plurality of first openings and second openings of different sizes, and the liquid crystal layer is disposed within the cavity. Additionally, the first protruding structures and the second protruding structures are located within the cavity, in which the first protruding structures are disposed corresponding to the first openings and the second protruding structures are disposed corresponding to the second openings, and the first protruding structures and the second protruding structures have different heights.

According to various embodiments of the present invention, the spacers are directly disposed on the glass substrate, in which the spacers may have different heights. Hence when a pressure or force is applied on an LCD, the cell gap can be maintained. By utilizing the opening size of the masking pattern to adjust the depth of the exposure, protruding structures of different heights can be simultaneously formed, in which the protruding structures are able to serve as spacers or aligning protrusions to simplify the fabrication process and reduce cost. Moreover, the disclosed embodiments of the present invention facilitate a one drop fill process and further expands the operation window of the volume of dropped liquid crystals.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

FIG. 4b is a cross-sectional diagram showing the color filter substrate along line 4b-4b of FIG. 4a.

FIG. 4c is a cross-sectional diagram showing the color filter substrate along line 4c-4c of FIG. 4a.

DETAILED DESCRIPTION

Figure 1:
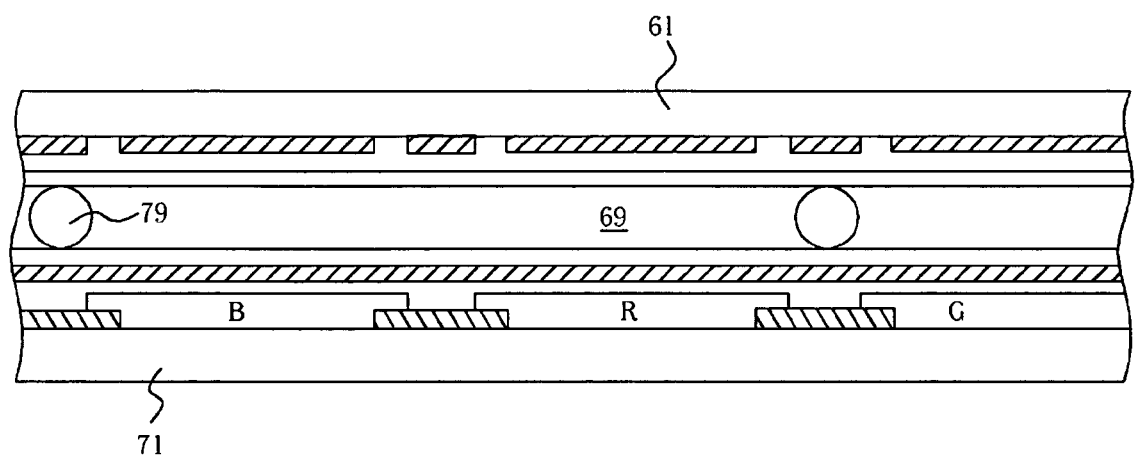
FIG. 1 is a cross-sectional diagram showing an LCD device with ball spacers.
Figure 2:
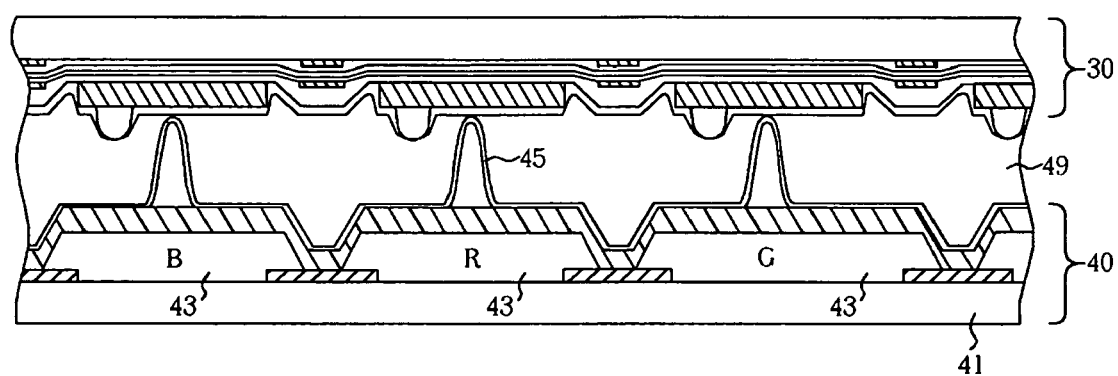
FIG. 2 is a cross-sectional diagram showing an LCD device with protruding pattern spacers.
Figure 3:
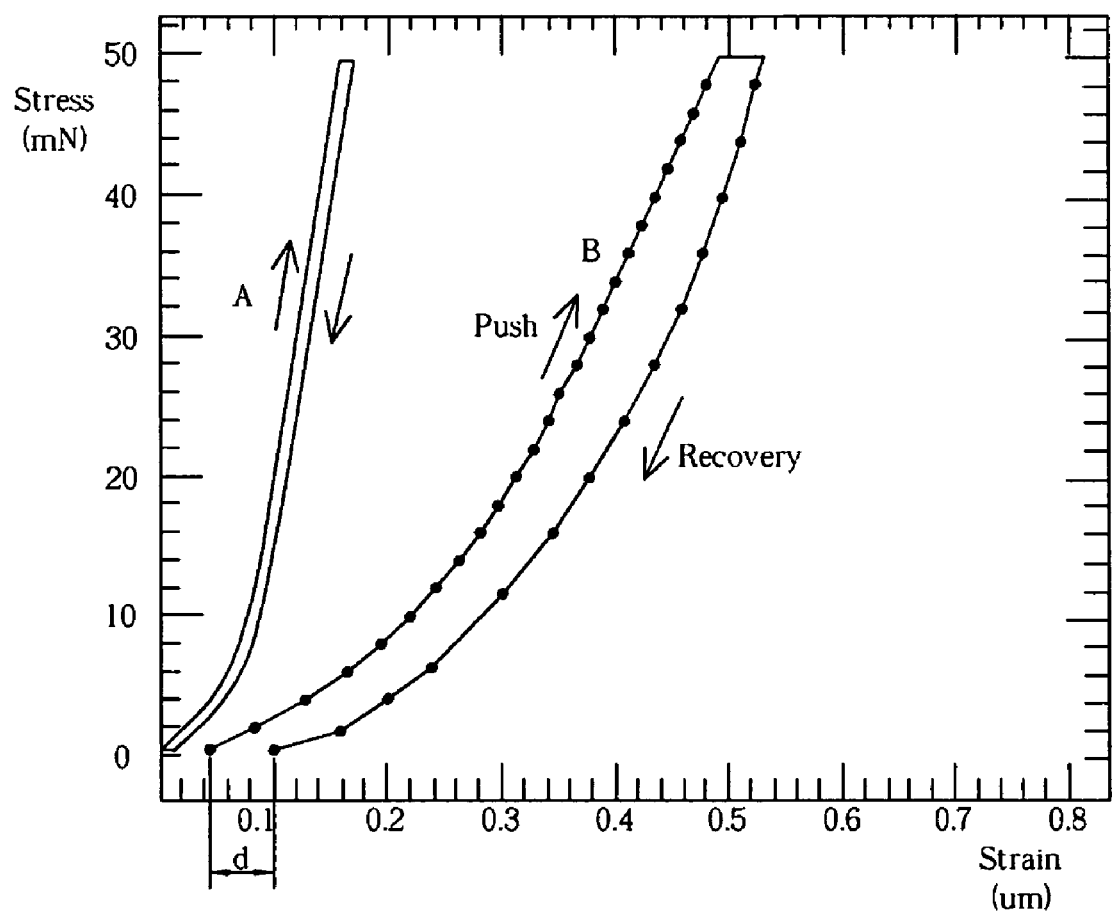
FIG. 3 is a stress-strain diagram showing the relationship between a columnar spacer directly disposed on a glass substrate and a columnar spacer disposed on a glass substrate having a color filter.
Figure 4A:
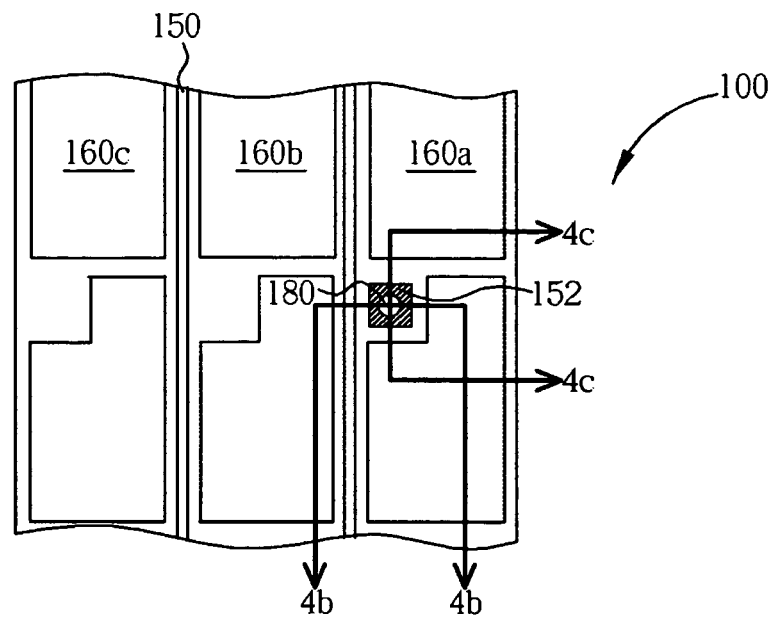
FIG. 4a is a flat-view diagram showing a color filter substrate of an LCD device according to some embodiments of the present invention.
Figure 4B:
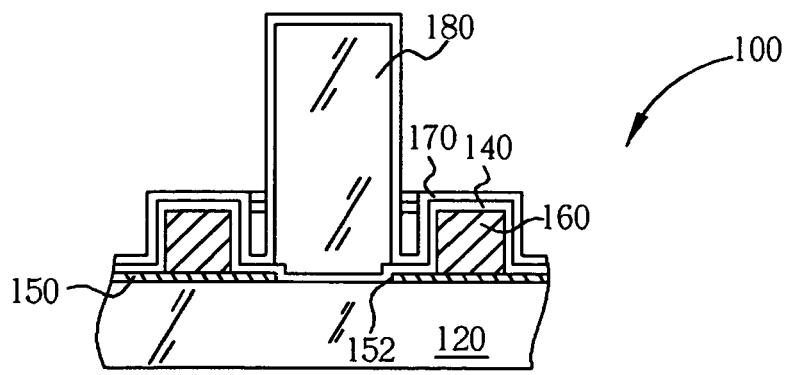
Figure 4C:
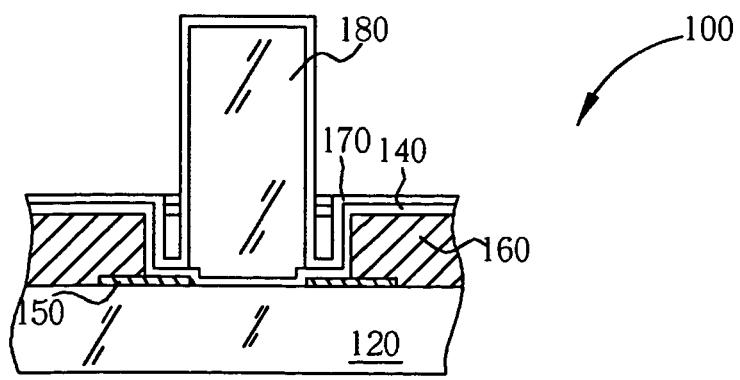

Please refer to FIGS. 4a, 4b, and 4c. FIGS. 4a, 4b, and 4c are perspective diagrams showing a spacer substrate according to some embodiments of the present invention. As shown in the figures, a color filter (CF) substrate 100 is utilized in a TFT LCD device.

As shown in FIG. 4a, a pixel of the CF substrate 100 includes three sub-pixels, in which the pixel is located corresponding to the thin film transistor of the TFT substrate (not shown). Please refer to FIGS. 4b and 4c. FIGS. 4b and 4c are cross-sectional diagrams showing the CF substrate 100 along the sectional line 4b-4b and 4c-4c. The CF substrate 100 includes a transparent substrate, such as a glass substrate 120, a black matrix 150 partially covering the glass substrate 120 for defining a plurality of pixel areas, in which the black matrix 150 is comprised of metals such as chromium (Cr) or chromium oxide (CrOx), or a black resin, and a spacer area 152.

Corresponding to inactive parts of the LCD device, the black matrix 150 and the spacer area 152 generally includes components such as a source bus, a drain bus, an auxiliary capacitor electrode, and a thin film transistor disposed on the TFT substrate.

Corresponding to active parts of the LCD device, the pixel area also includes a pixel electrode of the TFT substrate. Additionally, a color filter 160 such as a red color filter 160a, a green color filter 160b, and a blue color filter 160c is disposed in an alternating pattern on the pixel area. As is widely known, the color filter 160 can be rearranged in various patterns.

Comprised of indium tin oxide (ITO), a common electrode 140 is disposed on the black matrix 150 and the color filter 160 and a plurality of spacers 180 is disposed on the common electrode 140 and within the spacer area 152. In other words, the spacers 180 are disposed on the glass substrate 120 and the common electrode 140 is disposed between the spacers 180 and the glass substrate 120. As is commonly known, the common electrode 140 is not provided by the CF substrate 100 in certain types of LCDs, such as the plane switching (IPS) LCDs.

Moreover, an alignment film 170 comprised of polyimide can be coated on the glass substrate 120, in which the thickness of the alignment film 170 is about 0.1 μm. Functioning to align the liquid crystal molecules in particular directions, the alignment film 170 is able to perform processes such as photo-alignment and rubbing processes, thereby eliminating the need of having additional rubbing processes.

According to one embodiment, among others, the thickness of the black matrix 150, the color filter 160, the common electrode 140, and the spacers 180 are approximately 0.16 μm, 1.5 μm, 0.15 μm, and 5.81 μm respectively. Evidently, the height of the spacers 180 is significantly larger than the cell gap, thereby facilitating the one drop fill process by expanding the operational window. Additionally, when the spacer substrate of the present invention is utilized in a vertically-aligned (VA) LCD device, the spacer substrate is able to incorporate a domain regulating means, such as forming a protrusion on the substrate or utilizing a narrow seam of the transparent electrode (such as the ITO slit) to control the direction of the liquid crystals. An example of a vertically-aligned LCD device having a regional control device is disclosed in European Patent No. 0,884,626-A2.

Figure 5:
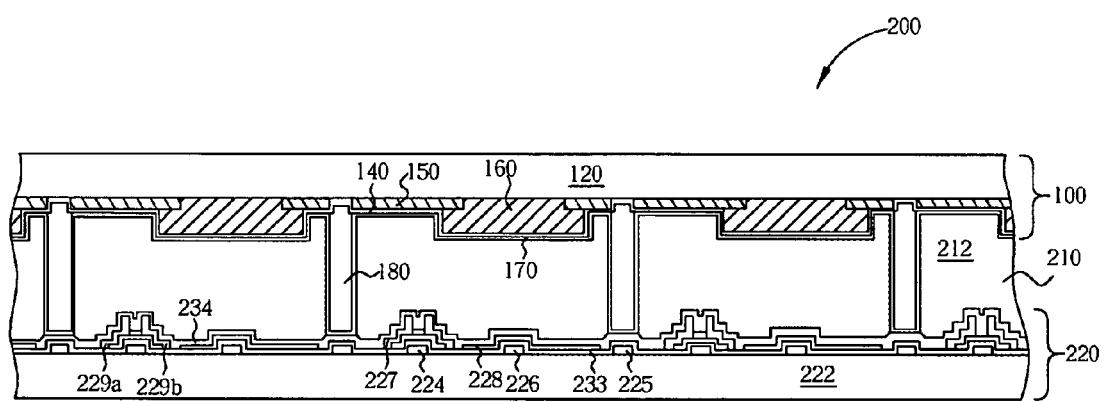
FIG. 5 is a partial cross-sectional diagram showing an LCD device according to one embodiment of the present invention.

Please refer to FIG. 5. As shown in FIG. 5, an LCD device 200 includes the CF substrate 100 and a TFT substrate 220, in which the edge of the CF substrate 100 and the TFT substrate 200 is bound together to define a cavity 212 for enclosing a liquid crystal material 210. The cavity 212 includes a uniform space (i.e. cell gap) defined by the spacers 180. The structure of the TFT substrate 220 is described as follows. First, a gate 224, a gate line (scan line) 225, and an auxiliary capacitor line 226 are formed on the glass substrate 222. Next, an insulating layer 233 is disposed on the gate 224, the gate line (scan line) 225, and the auxiliary capacitor line 226. Next, a semiconductor layer 227 is formed on the insulating layer 233 of each gate 224 for serving a TFT pathway. Next, a metal layer 229a and 229b is formed on the top portion of the semiconductor layer 227 and electrically connected to a source circuit and a pixel electrode 228 for serving as the source area and drain area of the TFT. Comprised of ITO, the pixel electrode 228 is disposed on every auxiliary capacitor line 226 with the insulating layer 233 disposed in between. Moreover, an alignment film 234 is formed on the source area 229a, the drain area 229b, and the pixel electrode 228.

Figure 6:
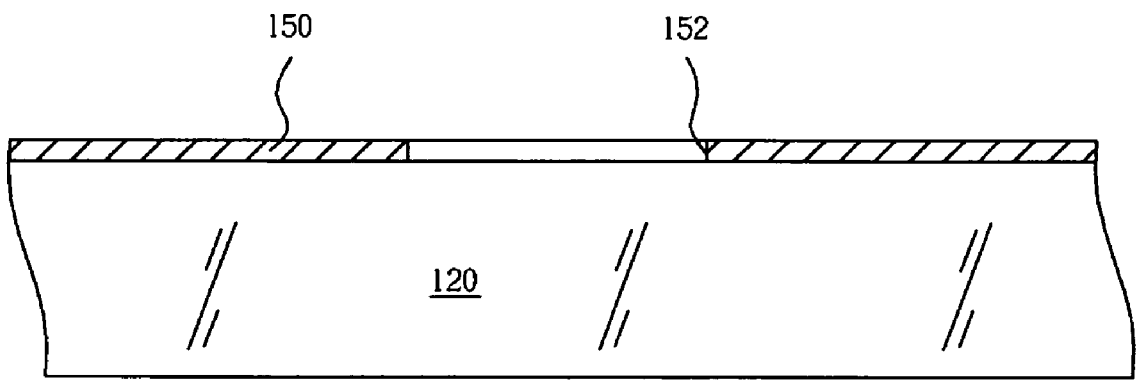
FIG. 6 through FIG. 10 are cross-sectional diagrams showing the method of fabricating a color filter substrate of an LCD device.

Additionally, some embodiments of the present invention also provide methods for fabricating the CF substrate 100. Please refer to FIG. 6. As shown in FIG. 6, a substrate 120, preferably a glass substrate, with a flat surface is provided. In order to reach a high contrast value and obtain an optical density of greater than 3.5 for forming a black matrix, a chromium layer with a thickness of 0.16 μm is formed on the glass substrate 120 and a photoresistance is then formed thereon. Next, a photomask with a predetermined pattern is utilized to develop the photoresistance. After the photoresistance is developed, an etching process is performed on the chromium layer to form the black matrix 150. Additionally, the black matrix 150 includes a spacer area 152, in which the spacer area 152 can be circular, octagonal, polygonal, tetragonal, triangular, square, or a variety of other geometrical shapes.

Figure 7:
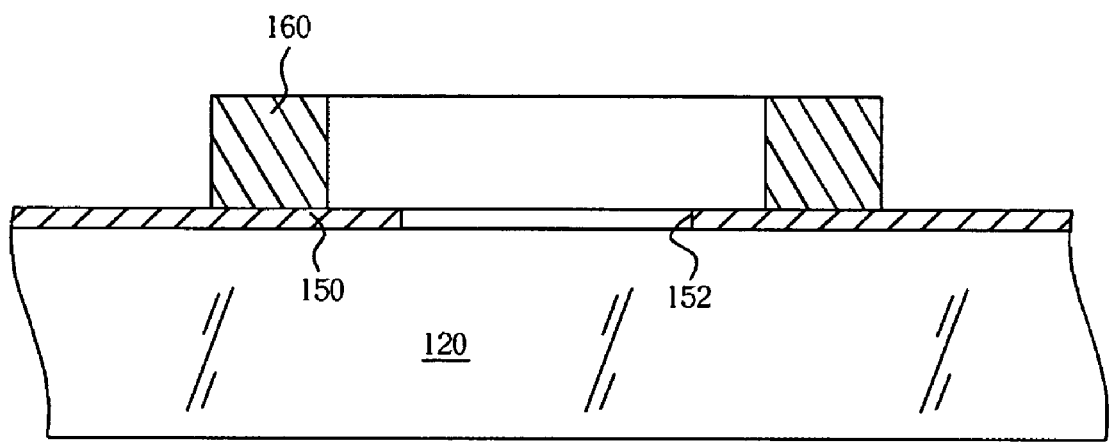

Please refer to FIG. 7. As shown in FIG. 7, a red, green, or blue color filter 160 is formed by coating a layer of red resin, green resin, or blue resin on the glass substrate 120. The thickness of the color filter 160 depends upon the material and color intensity of the photoresistance. Preferably, the default thickness of the color filter 160 is approximately 1.5 μm and the color filter 160 is overlapped with the black matrix 150 near the edge area. By utilizing a photolithography process, the color filter 160 is formed into a pattern for exposing the black matrix 150 and the spacer area 152 disposed underneath.

Figure 8:
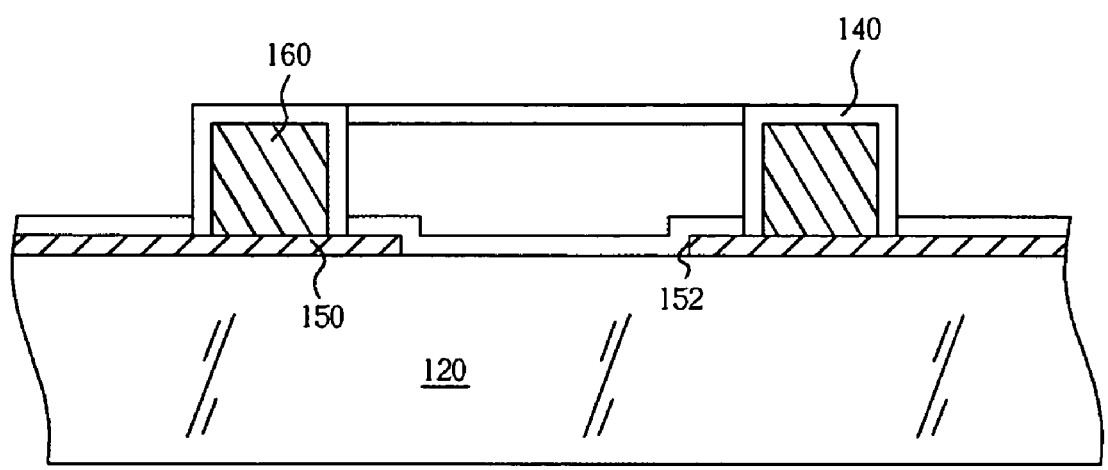

Next, an ITO layer with a thickness of approximately 0.15 μm is disposed on the color filter 160, the black matrix 150, and the spacer area 152 to form a common electrode 140, as shown in FIG. 8.

Figure 9:
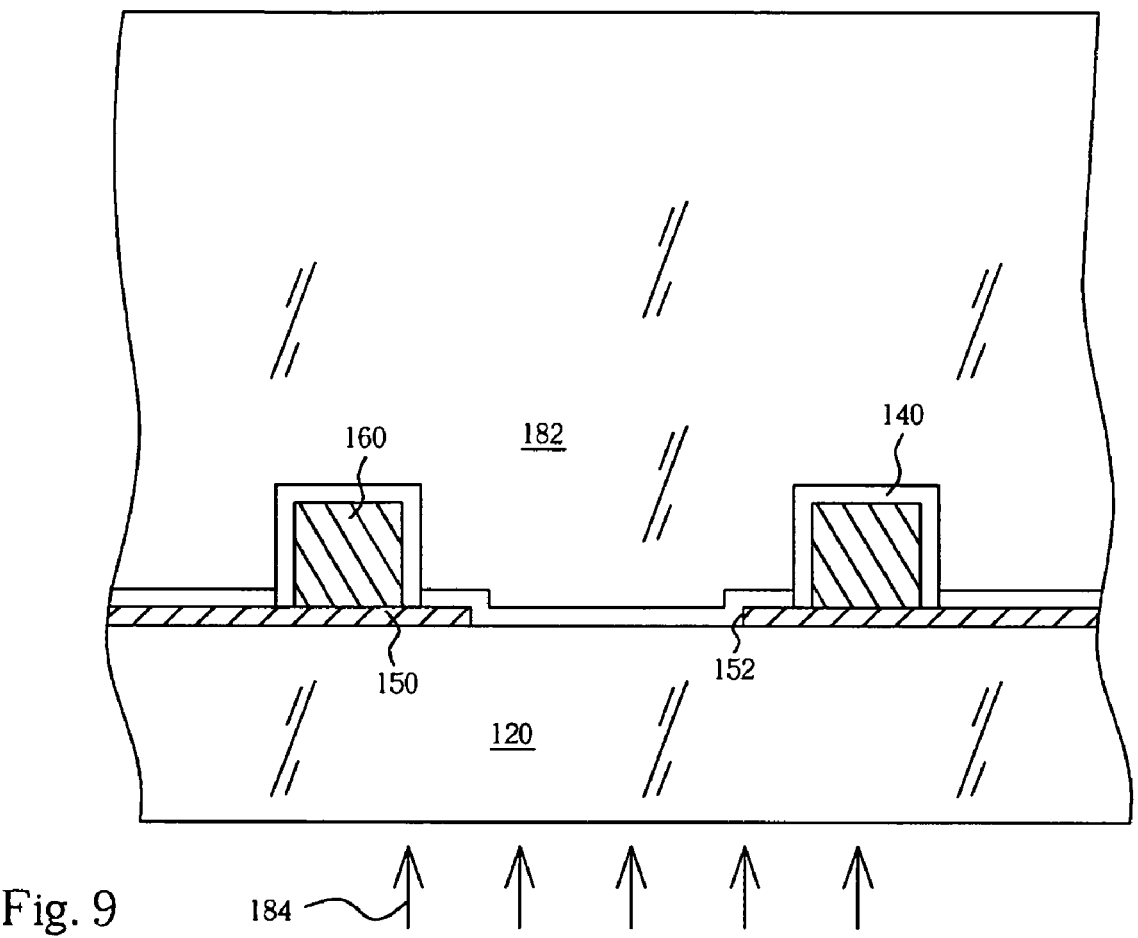

Next, a negative photoresistance 182 is coated on the glass substrate 120, in which the negative photoresistance 182 also covers the spacer area 152, as shown in FIG. 9. Next, a light beam, such as an ultraviolet light 184 is utilized to irradiate the glass substrate for exposing the negative photoresistance 182. After the exposure, the negative photoresistance 182 generates a cross linking, hence the negative photoresistance 182 solidifies and becomes insoluble in a developing agent.

Figure 10:
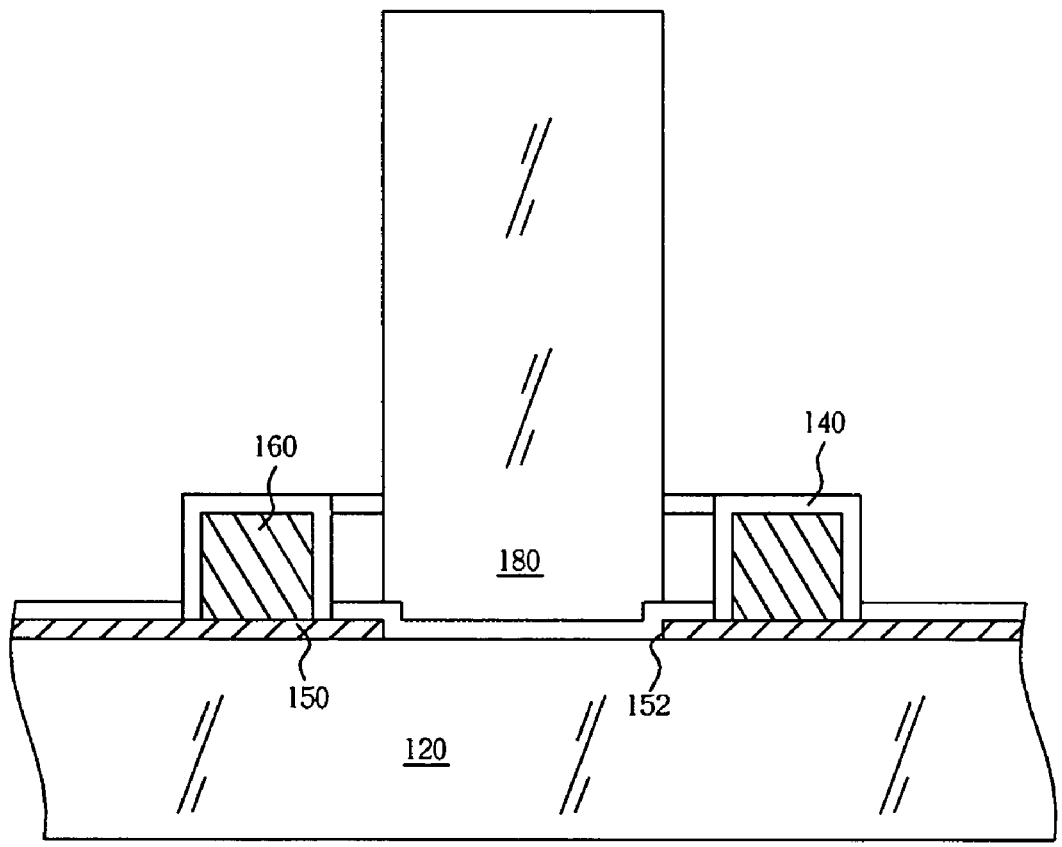

After the development and curing process, the negative photoresistance 182 transforms into one of the spacers 180 with a height of approximately 5.81 μm. As is widely known, the shape of the spacers 180 is not limited to a cylindrical shape, but can also be conical, octagonal, octagonal pyramidal, polygonal, polygonal pyramidal, columnar, or a variety of other shapes. Preferably, the color filter 160 is impenetrable to the ultraviolet light 184 to prevent the negative photoresistance 182 from being cured. Hence, the color filter 160 and the black matrix 150 serve as a photomask to facilitate the formation of the spacers 180, as shown in FIG. 10.

According to an actual experiment, a penetration ratio of the current color filter, ITO, and glass substrate with corresponding ultraviolet lights at different wavelengths is shown in table 1 below:

TABLE 1

| Wave length (λ) | R/ITO R745-4 (2 um) | G/ITO G772-4 (2 um) | B/ITO B764-4 (2 um) | ITO + glass 0.6 mm glass | bare glass 0.6 mm |
|---|---|---|---|---|---|
| J line (335 nm) | 0 | 0 | 0 | 54.45% | 74.39% |
| I line (365 nm) | 7.10% | 1.31% | 0 | 66.73% | 84.99% |
| H line (405 nm) | 5.07% | 0.54% | 36.51% | 70.36% | 90.64% |
| G line (437 nm) | 1.13% | 0.27% | 64.92% | 81.77% | 91.15% |

According to table 1 above, the first column includes ultraviolet lights J line (335 nm), I line (365 nm), H line (405 nm), and G line (437 nm) and the first row includes red negative photoresistance+ITO (JSR Corp. Model No. R745-4 with 2 um thickness) on a 0.6 mm glass, green negative photoresistance+ITO (JSR Corp. Model No. R772-4 with 2 um thickness) on a 0.6 mm glass, blue negative photoresistance+ITO (JSR Corp. Model No. R764-4 with 2 um thickness) on a 0.6 mm glass, ITO+bare glass (0.6 mm thickness), and bare glass (0.6 mm thickness).

Preferably, the ultraviolet lights J line (335 nm), I line (365 nm), H line (405 nm), and G line (437 nm) are emitted from a USHIO10KW lamp of an exposure equipment and measured by utilizing an UV spectrum meter (e.g., Model No. USHIO Spectroadiometer USR-405).

As shown in table 1, a fairly minimal penetration ratio is produced when the ultraviolet J line (335 nm) irradiates the red negative photoresistance+ITO, green negative photoresistance+ITO, and green negative photoresistance+ITO, thereby producing relatively low amounts of irradiating energy and increasing the amount of curing time required for the negative photoresistance 182 to from into the spacers 180. The ultraviolet light H line (405 nm) and G line (437 nm) on the other hand, produce much higher penetration ratios and thereby facilitate the curing of the negative photoresistance 182 and inhibit the deposition of the liquid crystals by altering the size of the cavity.

By having the penetration ratio between the J line (335 nm) and the H line (405 nm) and G line (437 nm), the ultraviolet light I line (365 nm) exhibits a higher penetration ratio to the ITO and glass substrate and a lower penetration ratio to the red, green, or blue color filters. By choosing the ultraviolet light with a wavelength of 365 nm to respond to the negative photoresistance 182, a photomask can be formed naturally by utilizing different color filters, including red, green, or blue color filters, as most other ultraviolet lights are only able to penetrate the spacer areas and form the spacers by hardening the negative photoresistance material. According to one embodiment of the present invention, a preferred penetration ratio of the area outside the spacer areas is less than 7.1% and an optimized penetration ratio is less than 1.31%.

In order to resolve problems such as remaining photoresistance on the color filter, an absorbent (such as an ultraviolet absorbent with 365 nm wavelength according to the present embodiment) is added into the color filter (such as the red and green color filter according to the present embodiment) to ensure that the ultraviolet lights will only pass through the spacer areas. By utilizing the red, green, or blue color filters and the black matrix to form a natural photomask, the lights will be aligned automatically within the spacer areas to form a plurality of spacers. Next, an alignment film is formed over the surface of the glass substrate 120, as shown in FIG. 4b.

As shown in FIG. 5, the CF substrate 100 is able to further combine with the TFT substrate 220, in which the edge of the CF substrate 100 and the TFT substrate 220 is laminated together to define the cavity 212 for enclosing the liquid crystal material 210. Preferably, the cavity 212 includes a uniform space (i.e. cell gap) defined by the spacers 180 and the liquid crystal material 210 is disposed between the CF substrate 100 and the TFT substrate 220 by utilizing a vacuum suction technique or a one drop fill technique. Finally, the LCD device is completed by installing a polarizer onto the CF substrate 100 and the TFT substrate 220.

According to another embodiment of the present invention, the spacers 180 are disposed directly onto the glass substrate 120, in which the spacers 180 are flexible in nature. When an external pressure is applied to the LCD device, the shape of spacers 180 will be altered. After the force or the pressure is released, the shape of the spacers 180, due to its flexible nature will return to its original size, thereby maintaining the uniformity of the cell gap and evenness of the display color, and by increasing the height of the spacers 180, the operation window of the one drop fill processes will be further increased.

Figure 11:
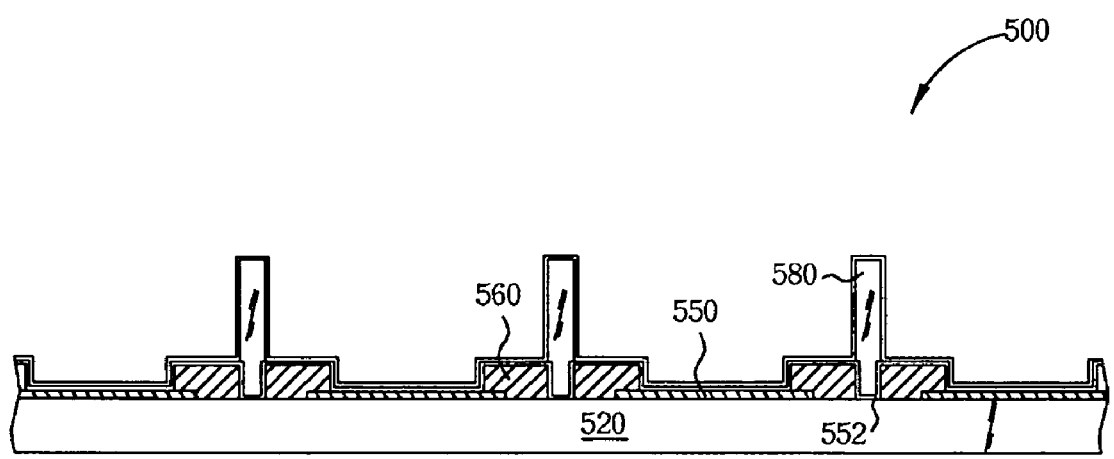
FIG. 11 is a partial cross-sectional diagram showing an LCD device according to another embodiment of the present invention.

Please refer to FIG. 11. FIG. 11 is a perspective diagram showing a CF substrate 500 according to another embodiment of the present invention. The CF substrate 500 includes a plurality of spacers 580 is disposed within a color filter 560. During the fabrication of the CF substrate 500, a black matrix 550 is first disposed on a glass substrate 520, in which the glass substrate 520 is partially exposed to define a plurality of pixel areas or color filter areas. Next, a plurality of color filters 560 is disposed in the color filter areas, in which the color filter areas further include a plurality of openings for defining a plurality of spacer areas 552. After the deposition and development of a negative photoresistance, a light beam will penetrate the spacer areas 552 and harden part of the negative photoresistance for forming a plurality of spacers 580. Since the spacer areas 552 are located within the pixel areas according to the present embodiment, the color of the material utilized for fabricating the spacers 580 can be the same as the color filter area for increasing the penetration ratio of the display.

Figure 12:
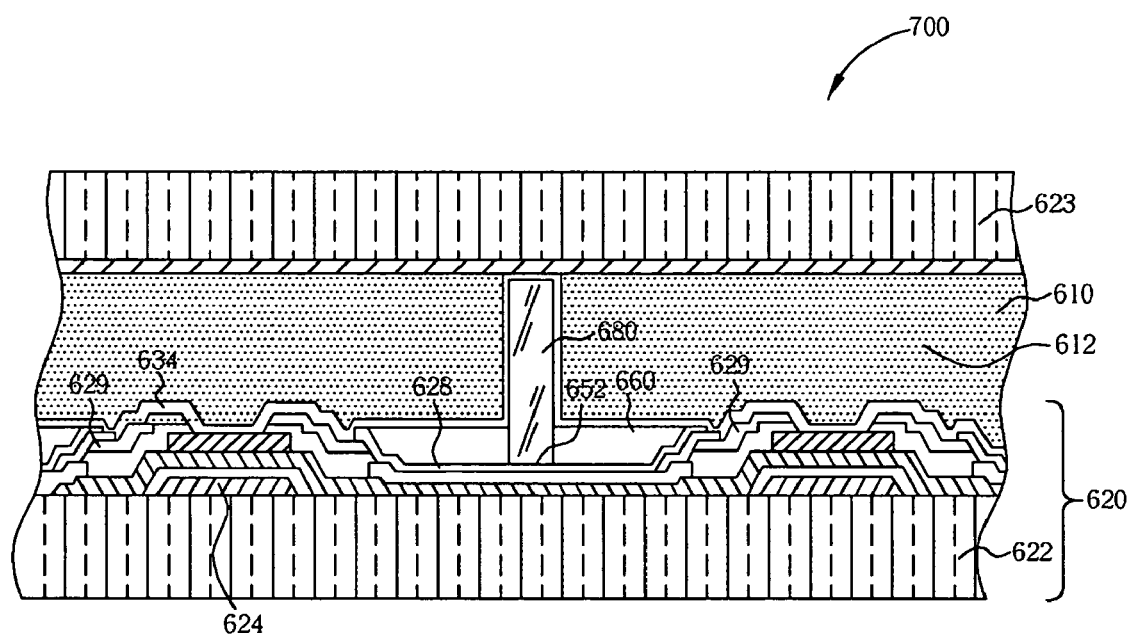
FIG. 12 is a partial cross-sectional diagram showing an LCD device according to another embodiment of the present invention.

Please refer to FIG. 12. FIG. 12 is a perspective diagram showing an LCD device 700 according to another embodiment of the present invention. Similar to the LCD 200, the LCD device 700 includes a TFT substrate 620, as shown in FIG. 12. The TFT substrate 620 further includes a transparent substrate 622, a gate electrode 624, a source 629, and a pixel electrode 628 (comprised of ITO), in which the gate electrode 624, the source 629, and the pixel electrode 628 are formed on the transparent substrate 622 via conventional methods. In general, the gate electrode 624, formed by photo-etching a first metal, is connected to a scan line whereas the source 629, formed by photo-etching a second metal, is connected to a data line. Additionally, a plurality of color filters 660 is formed on the pixel electrode 628 within the TFT substrate 620 and a plurality of spacers 680 is disposed within the color filters 660.

During the fabrication of the TFT substrate 620, a plurality of color filters 660 is formed on the pixel electrode 628 to expose part of the pixel electrode 628 for defining a plurality of pixel areas. Additionally, the color filters 660 include a plurality of openings for exposing the pixel electrode 628 and defining a plurality of spacer areas 652. After the deposition and development of a negative photoresistance, an ultraviolet light will penetrate the spacer areas 552 from the external side of the transparent substrate 622 and harden part of the negative photoresistance for forming a plurality of spacers 680. Moreover, an alignment film 634 will also form over the surface of the source 629, the color filter 660, and the spacers 680.

Additionally, the TFT substrate 620 can be combined with another substrate 623 to form the LCD device 700, in which the edge of the TFT substrate 620 and the edge of substrate 623 are laminated together to define a cavity 612 for enclosing a liquid crystal material 610. As shown in the figure, the cavity 612 includes a uniform gap (cell gap) defined by the plurality of spacers 680. As is commonly known, two polarizers (not shown) can be subsequently installed onto the exterior surface of the TFT substrate 620 and the substrate 623.

Figure 13:
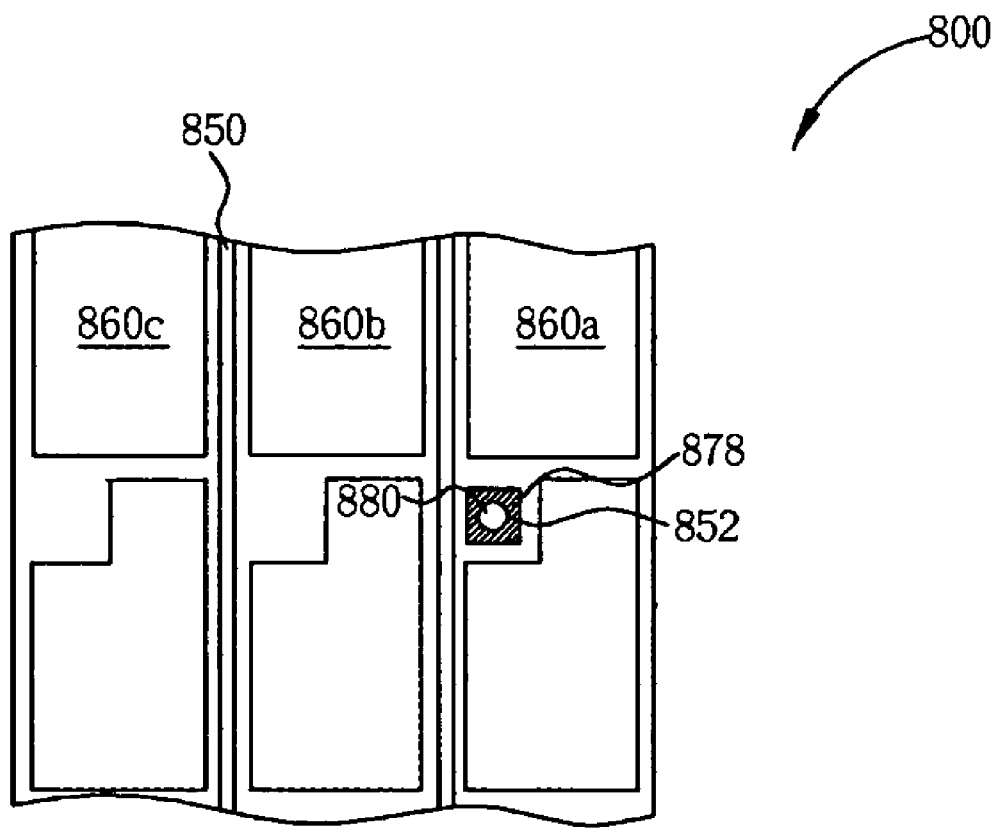
FIG. 13 is a perspective diagram showing a CF substrate according to another embodiment of the present invention.

Please refer to FIG. 13. FIG. 13 is a perspective diagram showing a CF substrate 800 according to another embodiment of the present invention. During the fabrication of the CF substrate 800, a black matrix 850 is first disposed on a glass substrate, in which the glass substrate is partially exposed to define a plurality of pixel areas or color filter areas and a plurality of openings 878. Next, a plurality of color filters 860a, 860b, and 860c are disposed on the color filter areas and the openings 878, in which a part of the glass substrate is further exposed for defining a plurality of spacer areas 852. After the deposition and development of a negative photoresistance, a light beam penetrates the spacer areas 852 and hardens part of the negative photoresistance to form a plurality of spacers 880. The location of the spacers 880 can correspond to the thin film transistor location of the TFT substrate (not shown).

Figure 14:
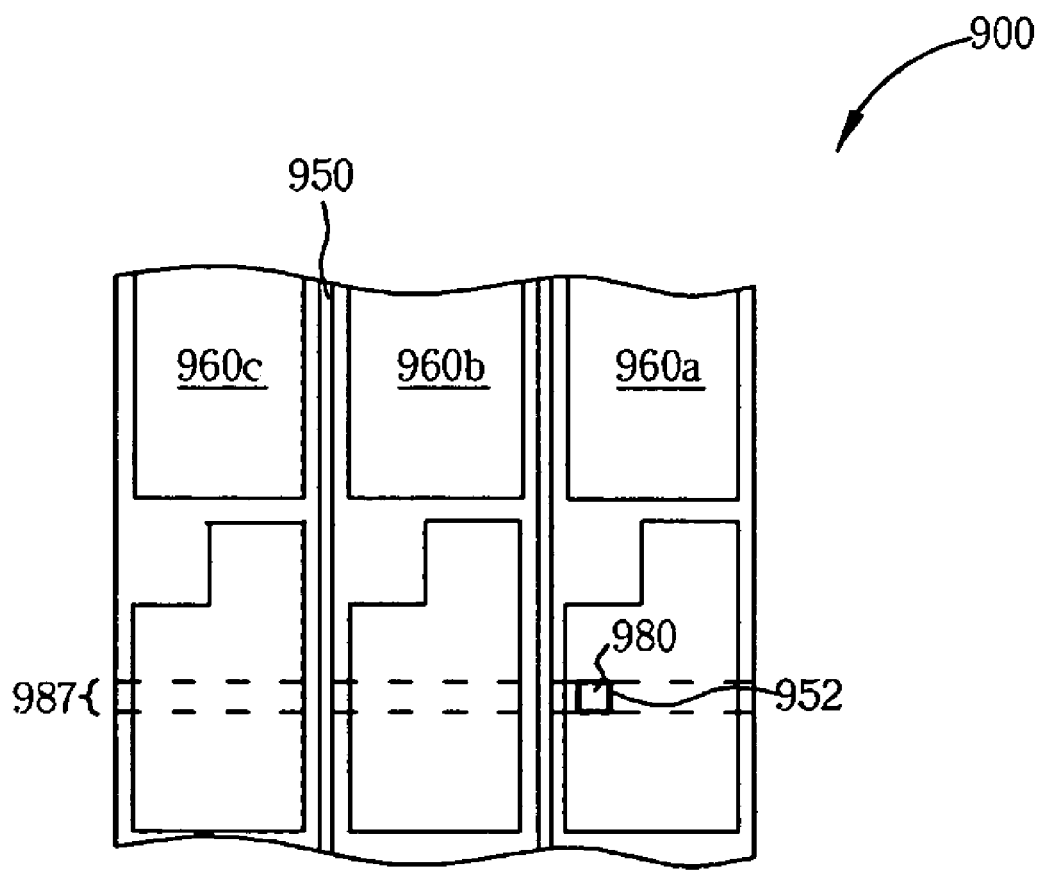
FIG. 14 is a perspective diagram showing a CF substrate according to another embodiment of the present invention.

Please refer to FIG. 14. FIG. 14 is a perspective diagram showing a CF substrate 900 according to another embodiment of the present invention. During the fabrication of the CF substrate 900, a black matrix 950 is first disposed on a glass substrate, in which the glass substrate is partially exposed to define a plurality of pixel areas or color filter areas. Next, a plurality of color filters 960a, 960b, and 960c are disposed on the color filter areas, in which part of the glass substrate is exposed to form a plurality of openings for defining a plurality of spacer areas 952. After the deposition and development of a negative photoresistance, a light beam penetrates the spacer areas 952 and hardens part of the negative photoresistance to form a plurality of spacers 980. The location of the spacers 880 can correspond to a capacitor area 987 of the TFT substrate (not shown).

Therefore, embodiments of the present invention are able to define spacer areas by utilizing existing patterns of an LCD, such as a black matrix, a color filter, a scan line or a first metal layer, or a data line or a second metal layer, in which the patterns are impenetrable to the external light beams that are utilized for exposing the photoresistance of the spacers. Consequently, the spacers can be formed on the substrate via exposure process from any external side of the substrate. Hence, spacers can be formed directly by utilizing the spacer areas on the patterns and thus no additional photomasks are required. Additionally, the spacers of the present invention can be utilized together with conventional ball spacers or adhesive spacers or can be comprised of a non-transparent material (such as a black resin) to prevent light leakages.

In general, embodiments of the present invention disclose methods of utilizing a non-transparent layer formed on a CF substrate or a TFT substrate to fabricate masking patterns and form spacers via a back-exposure process. By utilizing the method described above as a base, the disclosed embodiments are able to utilize the opening size (such as the spacer area described above) defined by the masking patterns to adjust the exposure depth of the photoresistance to each corresponding location of the openings, thereby forming hybrid spacers with different heights. By forming hybrid spacer with different heights, this technique is able to increase the compression resist capability of the LCD and enhance the operation window of the one drop fill technique.

Figure 15:
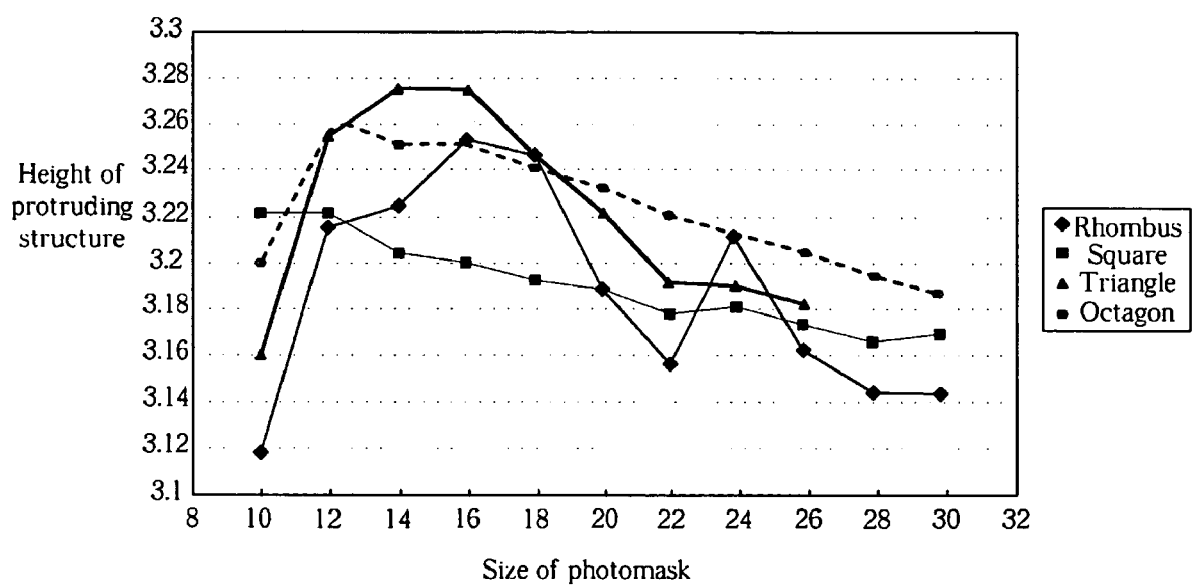
FIG. 15 is a diagram showing the relationship between the size and shape of mask openings and the corresponding height of protruding structures.
Figure 16:
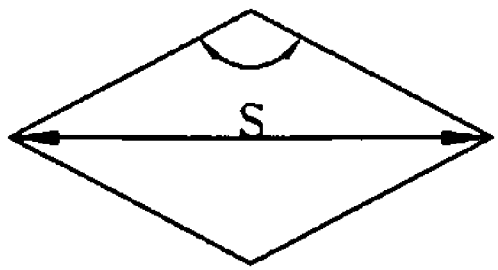
FIG. 16 is a perspective diagram showing the size of openings according to different photomasks from FIG. 15.
Figure 16:
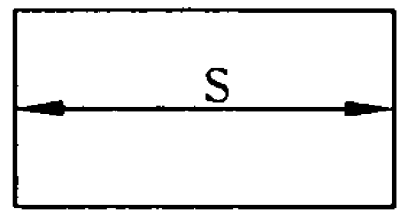
Figure 16:
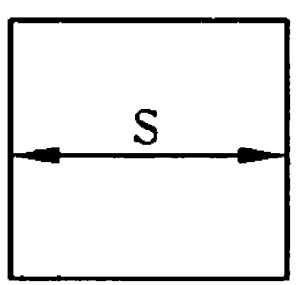
Figure 16:
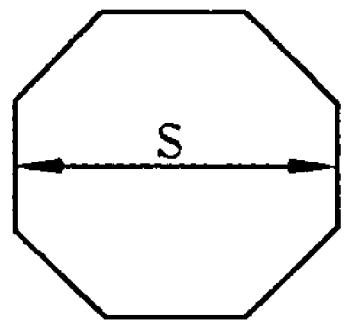

Please refer to FIGS. 15 and 16. FIG. 15 is a diagram showing the relationship between the size and shape of the mask openings and the corresponding height of protruding structures and FIG. 16 is a perspective diagram showing the size of the openings according to different photomasks from FIG. 15. As shown in FIG. 15, the horizontal coordinates indicate the opening size of the mask whereas the vertical coordinates indicate the height of the protruding structure, in which the shape of the mask opening varies from rhombus, rectangle, square, to octagon. As shown in FIG. 16, the size of the mask opening is indicated by the character S and as shown in FIG. 15, it should be appreciated that protruding structures of different heights are formed based on openings of different sizes. In other words, by utilizing the opening size of the photomask, the embodiments of the present invention are able to control the exposure depth of the corresponding photoresistance thereby producing protruding structures of different heights.

By combining the back-exposure process with the photomask adjustment technique, the embodiments of the present invention are able to form protruding structures that have different heights within an LCD device, in which the protruding structures can be further utilized as hybrid spacers. Different methods regarding the formation of protruding structures with different heights are discussed below.

Please refer to FIG. 17A through FIG. 17D. FIG. 17A through FIG. 17D are diagrams showing a method of fabricating a protruding structure according to some embodiments of the present invention.

Figure 17A:
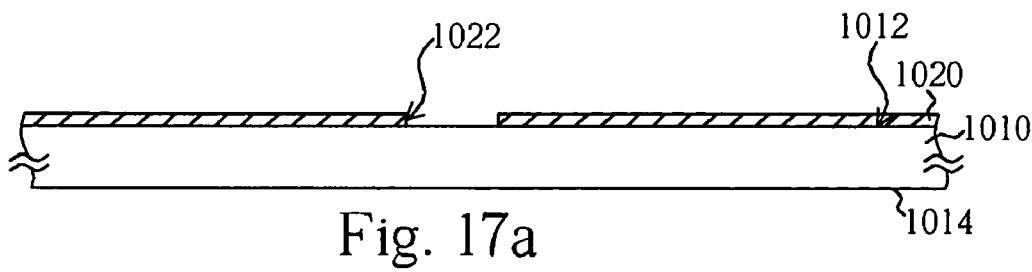
FIG. 17A through FIG. 17D are diagrams showing the method of fabricating a protruding structure according to some embodiments of the present invention.

As shown in FIG. 17A, a substrate 1010 is provided, in which the substrate 1010 can be a CF substrate or a TFT substrate described above. The substrate 1010 includes a corresponding first surface 1012 and a second surface 1014, in which the first surface 1012 includes a masking pattern 1020 thereon. Preferably, the masking pattern 1020, which can be the black matrix, color filter, scan line or the first metal layer, data line or the second metal layer described previously, is utilized for defining a plurality of openings 1022, in which the openings 1022 can be the spacer areas described above.

Figure 17B:
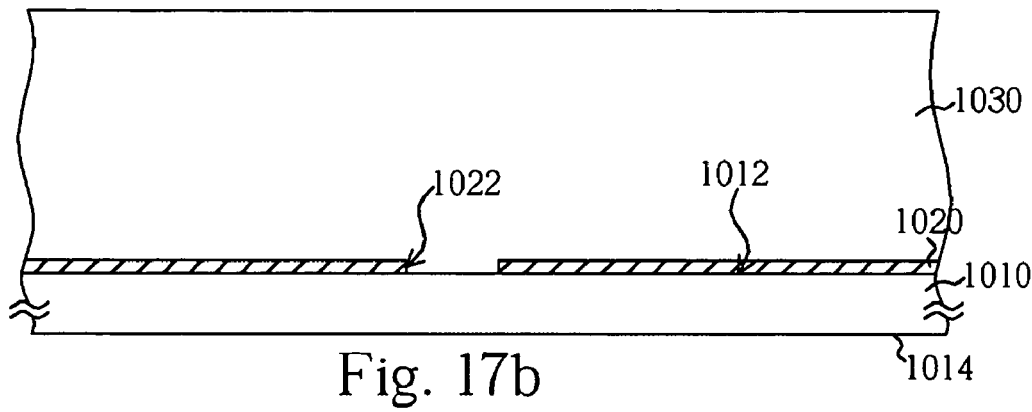

Next, a photoresistance 1030 is formed over the surface of the substrate 1010 to cover the masking pattern 1020, in which the photoresistance 1030 is a negative photoresistance, as shown in FIG. 17B.

Figure 17C:
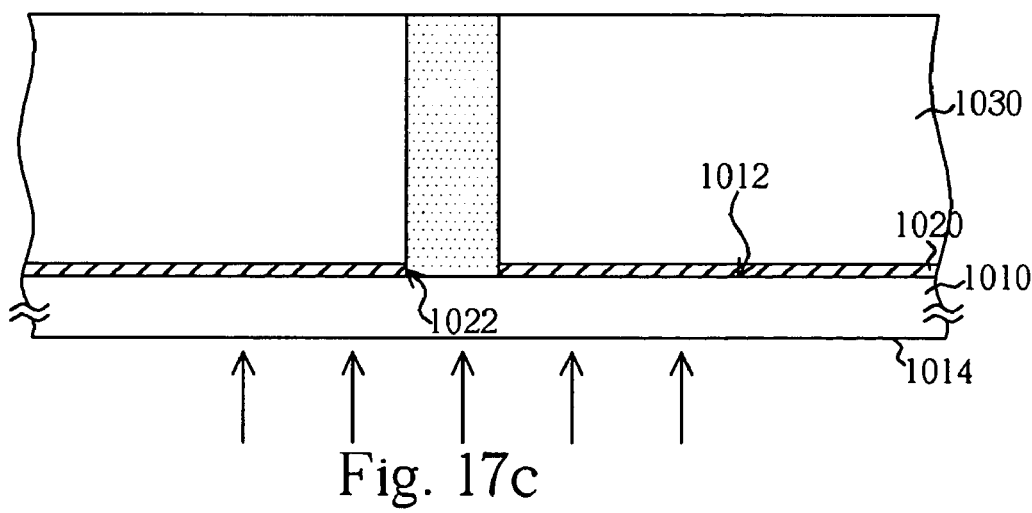

Next, a back-exposure process is performed on the photoresistance 1030 from the second surface 1014 of the substrate 1010, as shown in FIG. 17C. Additionally, the shape and size of the mask can be selected according to the relational diagram of FIG. 15 to form the openings 1022. For instance, a square opening 1022 can be formed, in which the size of the openings 1022 can be utilized to adjust the exposure depth of the photoresistance.

Figure 17D:
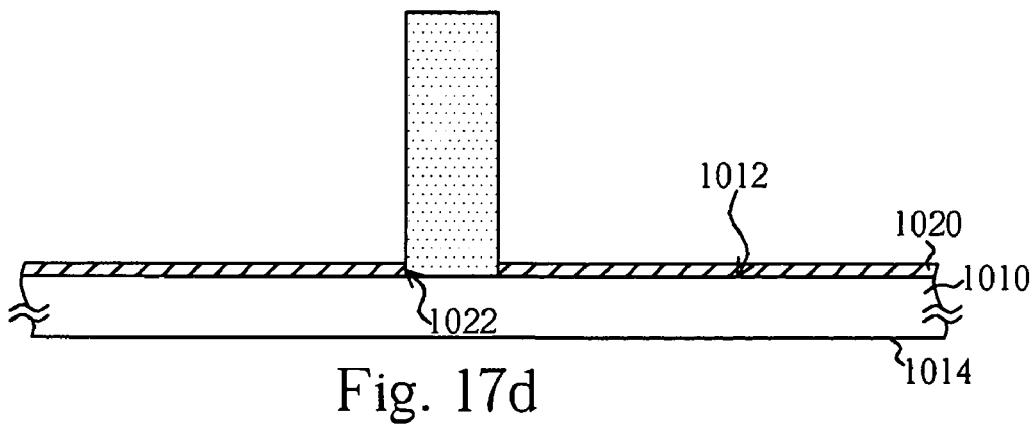

Next, the photoresistance 1030 is developed to form a plurality of protruding structures 1032 corresponding to the openings 1022, as shown in FIG. 17D.

Evidently, protruding structures with same height can be formed simultaneously on the substrate 1010. Nevertheless, if the masking patterns 1020 include different sizes of openings 1022, the protruding structures 1032 will likely be different due to the different depths of exposure.

Figure 18:
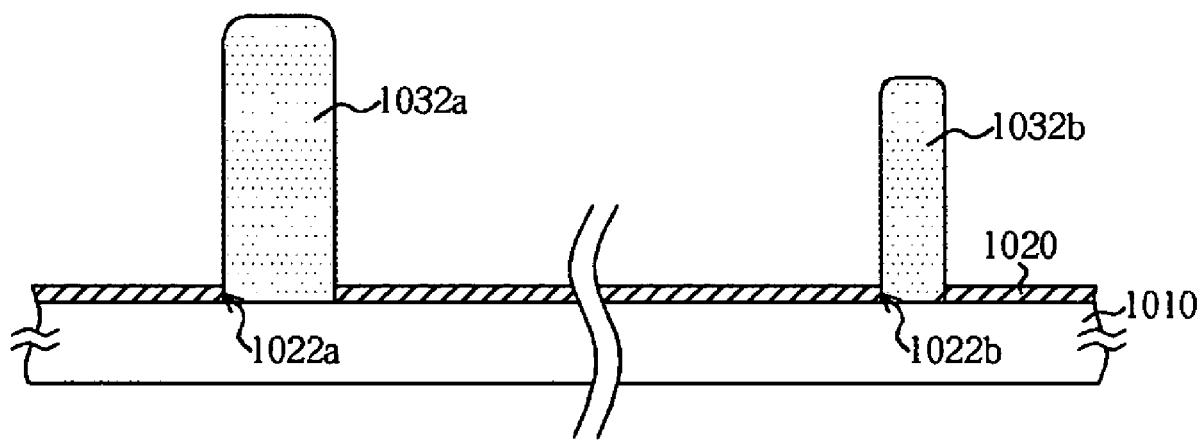
FIG. 18 is a perspective diagram showing a substrate including protruding structures of different heights.

Please refer to FIG. 18. FIG. 18 is a perspective diagram showing a substrate including protruding structures of different heights. As shown in FIG. 18, the masking pattern 1020 of the substrate 1010 includes a first opening 1022*a* and a second opening 1022*b*, in which the size of the first opening 1022*a* is different from the size of the second opening 1022*b*. After performing a back-exposure process and photo-development on the first opening 1022*a* and the second opening 1022*b*, a first protruding structure 1032*a* and a second protruding structure 1032*b* of different heights can be formed simultaneously. Suppose the height difference between the first protruding structure 1032*a* and the second protruding structure 1032*b* is 0.4 µm, the first protruding structure 1032*a* and the second protruding structure 1032*b* can be utilized as spacers to form LCDs with hybrid spacers.

Figure 19:
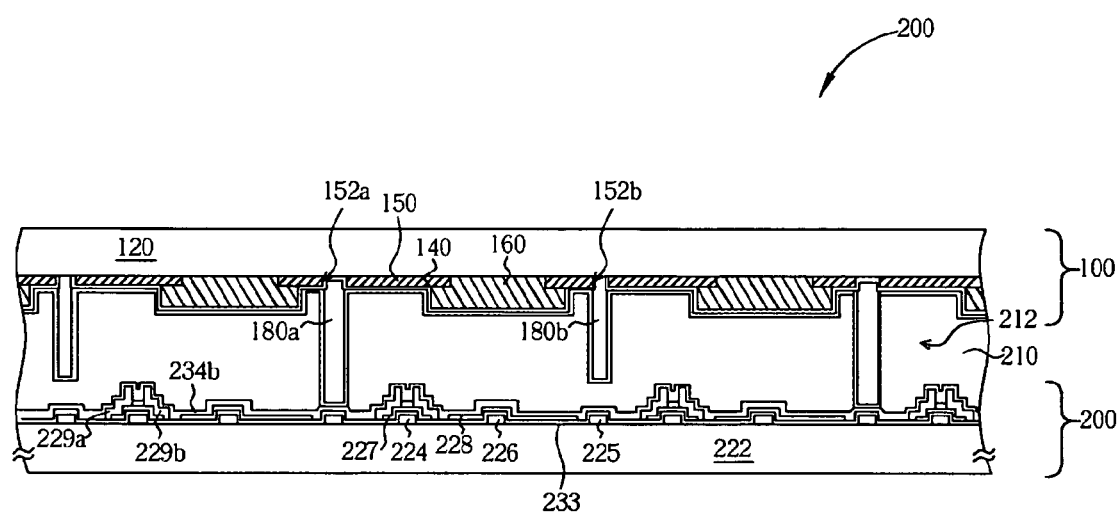
FIG. 19 through FIG. 21 are perspective diagrams showing spacers of different heights.

As shown in FIG. 19, the black matrix 150 is utilized as a masking pattern to define the spacer areas 152*a* and 152*b* of different sizes and form the spacers 180*a* and 180*b* of different heights on the CF substrate 100 after the processes including coating of photoresistance, back exposure, and development are completed.

Figure 20:
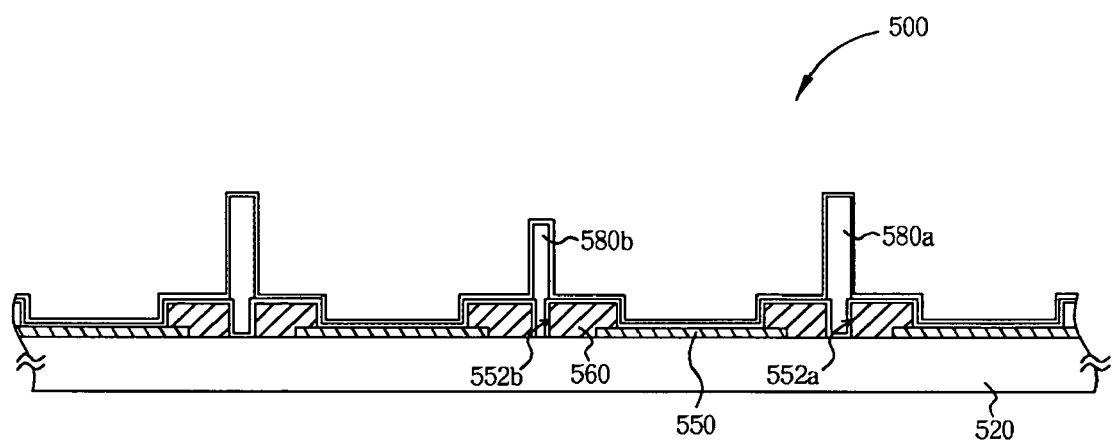

Additionally, the color filter 560 can be utilized as a masking pattern to define the spacer areas 552*a* and 552*b* of different sizes as shown in FIG. 20, in which a light absorbent can be further added into the color filter 560 to increase the masking effect. In the same way, spacers 580*a* and 580*b* of different heights are formed on the CF substrate 500 after a coating of photoresistance, back exposure process, and development.

Figure 21:
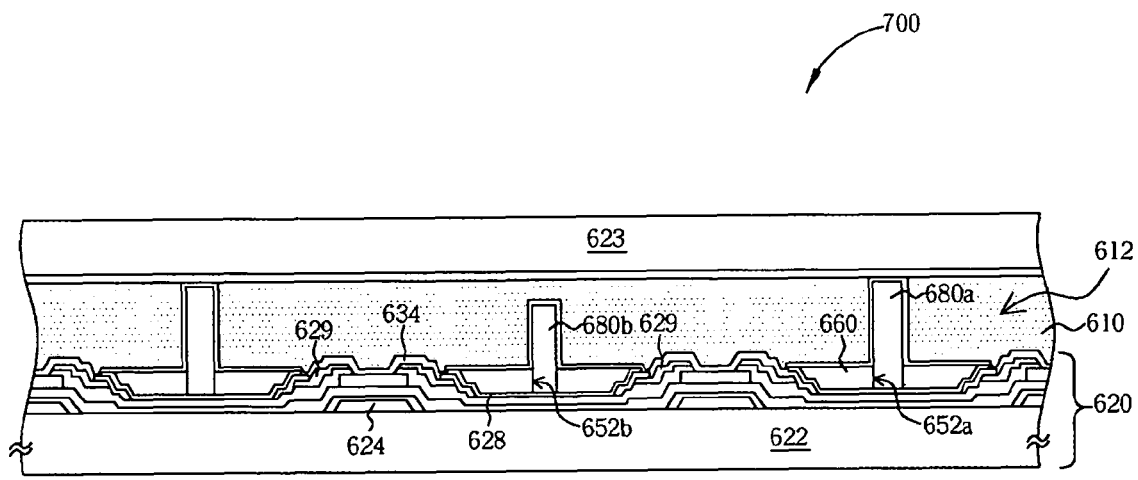

According to the structure of forming the color filter 660 (such as a color filter on array) on the TFT substrate 620 shown in FIG. 21, the color filter 660 disposed on the pixel electrode 628 is also able to define the spacer areas 652*a* and 652*b* of different sizes and form spacers 680*a* and 680*b* of different heights.

In addition to the embodiment described from FIG. 19 through FIG. 21, other embodiments of the present invention are able to utilize black matrices and color filters simultaneously to define spacer areas of different sizes. Moreover, the spacers formed on the black matrix correspond to the thin film transistors, scan lines, and data lines of the TFT substrate and the spacers formed on the color filter correspond to the auxiliary capacitor electrode of the TFT substrate, thereby preventing the influence of the aperture ratio of the LCD device. In other words, the spacers are located on the corresponding inactive area of the LCD device, in which the inactive area include devices such as a source bus (scan lines), a gate bus (data lines), an auxiliary capacitor electrode, and a thin film transistor.

In addition to the fabrication of spacers, the technique of forming protruding structures can be further utilized in multi-domain vertical alignment (MVA) LCD devices to form aligning protrusions on the CF substrate or TFT substrate while fabricating the spacers.

Figure 22:
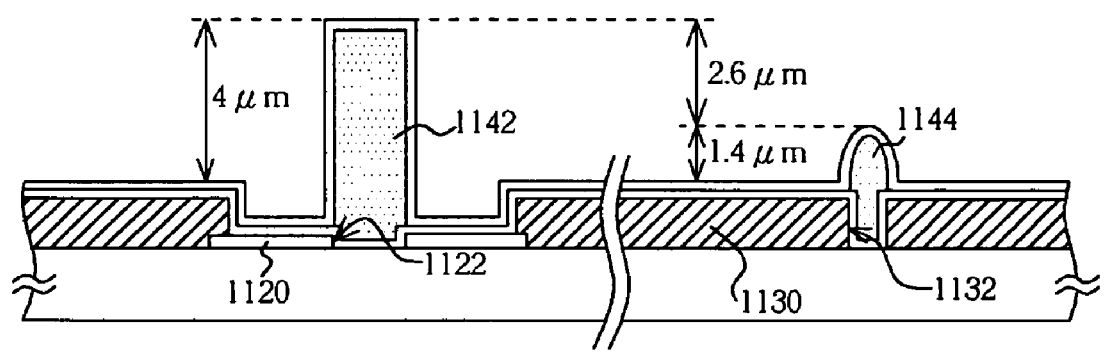
FIG. 22 is a perspective diagram showing a CF substrate according to an embodiment of the present invention.

Please refer to FIG. 22. FIG. 22 is a perspective diagram showing a CF substrate according to another embodiment of the present invention. As shown in FIG. 22, a black matrix 1120 defines a first opening 1122 and a color filter 1130 defines a second opening 1132, in which the size of the first opening 1122 is 20 μm and the size of the second opening 1132 is 11 μm. Additionally, the heights of a first protruding structure 1142 and a second protruding structure 1144 formed thereon are 4 μm and 1.4 μm respectively, in which the height difference between the two protruding structures is 2.6 μm. Essentially, the height difference between the two structures can be obtained from the relational diagram of FIG. 15 and the first protruding structure 1142 having a height of 4 μm can be utilized as a spacer whereas the second protruding structure 1144 with a height of 1.4 μm can be utilized for aligning purposes.

Figure 23:
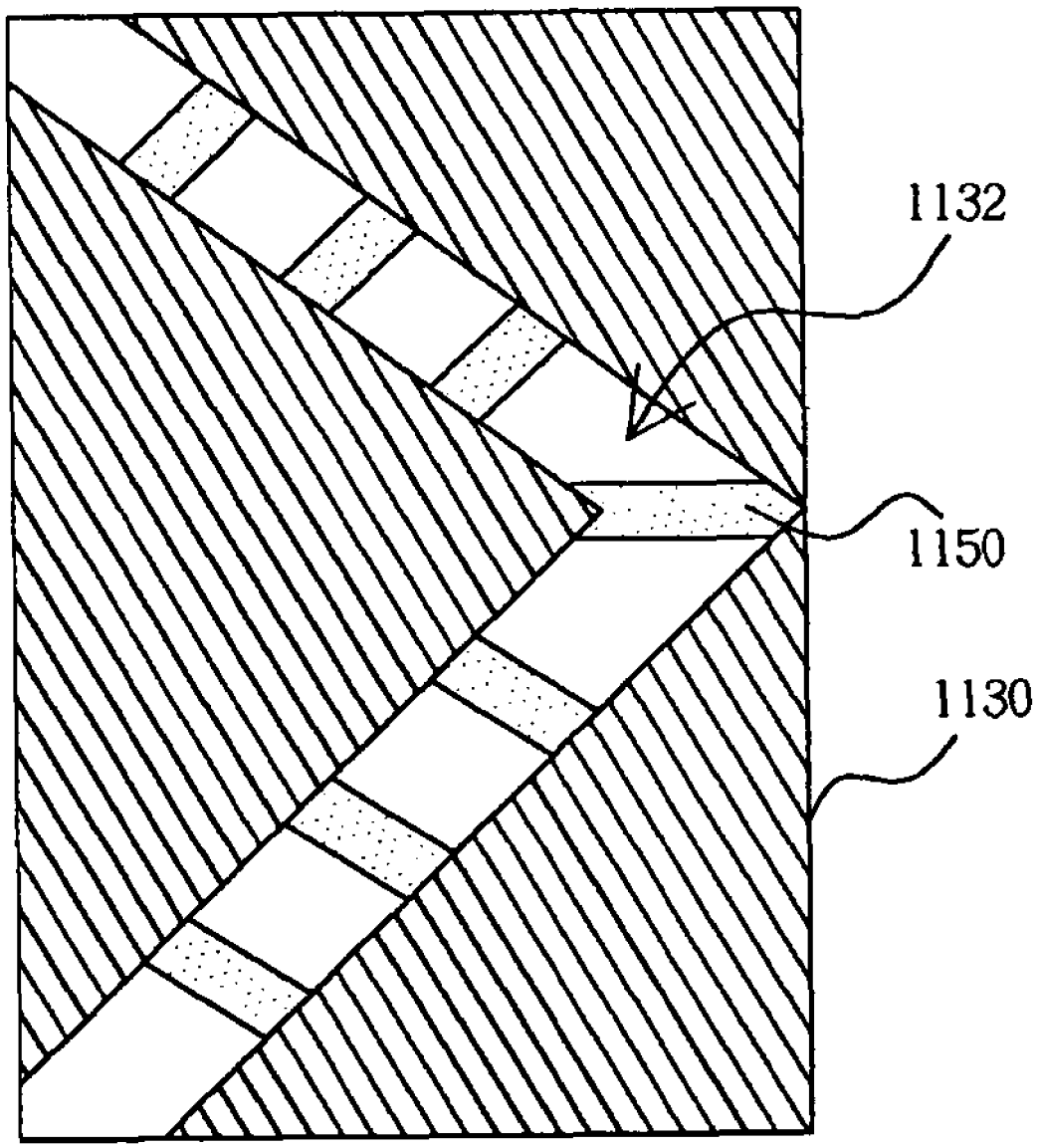
FIG. 23 is a perspective diagram showing a CF substrate according to an embodiment of the present invention.

Please refer to FIG. 23. FIG. 23 is a partial perspective diagram showing the CF substrate 1130 of FIG. 22. As shown in FIG. 23, a masking pattern 1150 can be partially retained within the second opening 1132 of the color filter 1130. By retaining the masking pattern 1150, several embodiments of the present invention are able to control the depth of exposure of the photoresistance formed in the second opening 1132, and thereby adjust the height of the second protruding structure.

Moreover, the black matrix 1120 of FIG. 22 or FIG. 23 can be defined with various sizes to form spacers of different heights, thereby providing a device an LCD device with both mixed spacers and aligning protrusions.

Overall, the disclosed embodiments exhibit the following characteristics and advantages:

(a) By utilizing spacers of different heights and disposing spacers directly on the glass substrate, the LCD device is able to quickly return to a normal state and the cell gap can be uniformly maintained after a pressure or force is applied.

(b) By utilizing the opening size of the masking pattern to adjust the exposure depth, protruding structures of different heights can be formed simultaneously, in which the protruding structures can be utilized as spacers or aligning protrusions to reduce the number of masks and required processes, thereby increasing production yield and decreasing fabrication cost.

(c) Spacers of different heights facilitate the one drop fill processes, thereby increasing the operation window of dropping the liquid crystal and increasing the overall yield.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of fabricating a liquid crystal display device comprising:

providing a first substrate and a second substrate;

forming a masking pattern on the surface of the first substrate, the masking pattern defining an open area as a spacer area in the masking pattern;

forming a color filter pattern on the surface of the first substrate, wherein the color filter pattern exposes the spacer area and a portion of the masking pattern around the spacer area;

forming a common electrode on the masking pattern, the color filter pattern and the spacer area;

coating a photoresistance on an interior surface of the first substrate;

illuminating a light on an exterior surface of the first substrate and through the spacer area of masking pattern and common electrode to irradiate the photoresistance; and developing the photoresistance to form a spacer directly over the spacer area, wherein the spacer is formed directly on the common electrode.

2. The method of fabricating a liquid crystal display device of claim 1, wherein the masking pattern is a first metal of an auxiliary capacitor of a thin film transistor.

3. The method of fabricating a liquid crystal display device of claim 1, wherein the masking pattern further comprises a second metal of an auxiliary capacitor of a thin film transistor.

4. The method of fabricating a liquid crystal display device of claim 1:

wherein the masking pattern further comprises a first opening, the first opening being a first size;

wherein the masking pattern further comprises a second opening, the second opening being a second size, the second size being larger than the first size;

wherein, after the photoresistance is developed, the method further comprises:

forming a first protruding structure corresponding to the first opening, the first protruding structure having a first protruding structure height;

forming a second protruding structure corresponding to the second opening, the second protruding structure having a second protruding structure height, the second protruding structure height being smaller than the first protruding structure height;

wherein the first substrate and the second substrate define a cell gap, the cell gap having a cell gap height, and the first height is greater than the cell gap height.

5. A method of fabricating a color filter substrate for a liquid crystal display device comprising:

providing a transparent substrate having a first side and a second side;

forming a black matrix on the first side of the transparent substrate, wherein a void of the black matrix exposes a first part of the first side of the transparent substrate, and wherein a second part of the first side of the transparent substrate is exposed to define a pixel area;

forming a color filter pattern on the first side of the transparent substrate, the color filter pattern defining a first open area as a spacer area, the color filter pattern covering a first portion of the void of the black matrix and exposing the spacer area;

forming a common electrode on the black matrix, the color filter pattern and the spacer area, wherein a penetration ratio for a light for hardening a spacer within the spacer area is greater than 54.45% and less than 81.77%;

coating a photoresistance on the first side of the transparent substrate;

exposing the second side of the transparent substrate through the spacer area of the color filter pattern and the common electrode to irradiate the photoresistance with light; and developing the photoresistance to form a spacer over the spacer area and directly on the common electrode.

6. The method of fabricating the color filter substrate of claim 5 further comprising:

wherein the first open area has a first open area size;

forming a second open area in the color filter pattern exposing a first portion of the pixel area, the second open area having a second open area size, the second open area size being different from the first open area size;

wherein the spacer has a spacer height;

forming a protruding structure corresponding to the second open area, the protruding structure having a protruding structure height, the protruding structure height being smaller than the spacer height, and the protruding structure is an alignment structure; and wherein the spacer is the same color as the color filter pattern covering the first portion of the void of the black matrix.

7. A method of fabricating a liquid crystal display device comprising:

providing a transparent substrate having a first side and a second side;

forming a black matrix on the first side;

exposing part of the first side of the transparent substrate by providing a first open area of the black matrix to define a spacer area and a second open area of the black matrix to define a pixel area;

forming a color filter pattern on the first side of the transparent substrate, the color filter pattern forming a first void exposing a portion of the black matrix around the spacer area and exposing the spacer area;

forming a common electrode on the black matrix, the color filter pattern and the spacer area, wherein a penetration ratio outside the first open area for a light having a wavelength of 335 nm is less than the penetration ratio outside the first open area for a light having a wavelength of 365 nm, 405 nm, or 437 nm;

coating a photoresistance on the first side of the transparent substrate;

exposing the second side of the transparent substrate through the spacer area and the common electrode to irradiate the photoresistance with light;

developing the photoresistance to form a spacer directly over the spacer area and directly on the common electrode;

providing a transistor substrate having a plurality of pixel electrodes;

binding the transistor substrate to the transparent substrate; and filling a liquid crystal material between the transistor substrate and the transparent substrate.

8. The method of fabricating the color filter substrate of claim 7, further comprising:

wherein the first open area has a first open area size;

wherein the color filter pattern forms a second void exposing a first portion of the pixel area, the second open area having a second open area size, the second open area size being different from the first open area size;

wherein the spacer has a spacer height;

forming a protruding structure corresponding to the second open area, the second protruding structure having a protruding structure height, the second height being smaller than the spacer height, and the protruding structure is an alignment structure.

* * * * *